United States Patent Office 3,242,119
Patented Mar. 22, 1966

3,242,119
WATER SOLUBLE SYNTHETIC RESIN COMPOSITIONS COMPRISING A MELAMINE-FORMALDEHYDE CONDENSATE AND AN UNOXIDIZED ALKYD RESIN
Gustav Ott, Arlesheim, Eduard Knecht, Basel, and Hans Gempeler, Muttenz, Switzerland, assignors to Ciba Limited, Basel, Switzerland, a Swiss company
No Drawing. Filed Mar. 21, 1961, Ser. No. 97,143
Claims priority, application Switzerland, Mar. 22, 1960, 3,179/60
8 Claims. (Cl. 260—29.4)

It is known to manufacture synthetic resin compositions by combining a water-soluble, curable methylolmelamine some methylol groups of which may be etherified by monohydric or polyhydric alcohols or partial ethers thereof, more especially by the lowest semi-ethers of glycol or diglycol, with an alkyd resin that contains carboxyl groups and acts as a plasticiser, has a hydroxyl number of 224 to 400 (hydroxyl equivalent 250–140) and preferably an acid number of about 40 or over, as well as with a water-soluble, strongly basic nitrogen compound capable of forming soaps with the alkyd resins, for example, ammonia, triethanolamine, putrescine, or cadaverine. Said synthetic resin compositions are soluble in water, at least when additionally a small amount of an organic solvent is present that is unrestrictedly or substantially miscible with water. The afore-mentioned specification does not enumerate any specific representatives of the large number of possible melamine+formaldehyde condensates and their ethers, covered by the above definition. Thus, said specification states that all melamine derivatives covered by said definition can be combined only with alkyl resins having the afore-mentioned hydroxyl number and acid number to form water-soluble synthetic resin compositions and that none of the other alkyl resins are suitable for such combinations.

It has now been found that when a methyl ether of the kind specified below, which is curable and water-soluble at room temperature is used, there are obtained water-soluble synthetic resins not only with the afore-mentioned alkyd resins but also with such as have a lower acid number and/or a substantially lower hydroxyl number, in the presence of a water-soluble, strongly basic nitrogen compound and, if desired, of an organic solvent that is unrestrictedly or substantially miscible with water; the synthetic resin compositions thus manufactured, both in substance and in the form of an aqueous solution, are distinguished by their stability, dilutability with water and flow properties, and in most cases they are even distinctly superior to the preparations made according to the examples of the known preparations referred to above. The aqueous solutions are easy to pigment and, when stoved on a support, they leave hard coats free from pitting. It is an advantage of the process of the invention that it widens considerably the choice of suitable alkyd resins and it is now possible, by using alkyd resins of a low acid number and/or a low hydroxyl number, to manufacture synthetic resin compositions which in an aqueous solution lend themselves more readily to pigmenting with basic dyestuffs and/or produce coats that are particularly resistant to water.

The present invention provides a process for the manufacture of unrestrictedly water-soluble synthetic resin compositions by combining a water-soluble, curable, etherified melamine-formaldehyde condensate with a plastifying alkyd or polyester resin containing carboxyl groups, and a water-soluble, strongly basic nitrogen compound capable of forming soaps with said resins, wherein the following components are combined in any desired order of succession:

(i) A curable methyl ether, which is water-soluble at room temperature, of a melamine-formaldehyde condensate that contains at least an equal number, and preferably twice the number, of methoxymethyl groups as there are free methylol groups present;

(ii) A plastifying alkyd resin that contains carboxyl groups and has an acid number not much less than 30 preferably 30 to 60 and a hydroxyl number not much less than 75 preferably 75 to 180;

(iii) A strongly basic nitrogen compound capable of forming water-soluble soaps with the component (ii) defined above, preferably a tertiary aliphatic amine, and (iv) An organic solvent that is unrestrictedly or substantially miscible with water and is compatible with the resin components, in an amount of 0 to 35% of the combined weights of components (i) and (ii), the proportions by weight of component (i) to component (ii) being in a ratio ranging from 20:80 to 80:20.

The new synthetic resin compositions prepared by the present process and their aqueous solutions are valuable raw materials for making aqueous, if desired pigmented, stoving varnishes, and they also form an object of the present invention.

As component (i) there are suitable as such known curable methyl ethers that are water-soluble at room temperature, such as can be manufactured by a known method by simultaneous or stepwise reaction of 1 molecular proportion of melamine with 2 to 6, preferably at least 3, molecular proportions of formaldehyde and with an excess of methanol, and if desired in the presence of an excess of formaldehyde. It is possible, for example, to heat a mixture of melamine, an aqueous formaldehyde solution and methanol in the presence of an acid, until all has passed into solution, whereupon the solution—if desired after having rendered it weakly alkaline and evaporated it—is cooled to room temperature, to yield the resulting methyl ether in substance or in the form of a concentrated aqueous solution. Alternatively, the reaction can be carried out stepwise, for example, by heating melamine in an alkaline medium with an aqueous formaldehyde solution until all has passed into solution, whereupon the resulting solution is cooled to room temperature, acidified and heated in admixture with methanol, after which the methyl ether so formed is separated from the resulting solution in the manner described above. According to another variant the melamine-formaldehyde condensate is isolated from the solution resulting from the alkaline condensation of melamine with an aqueous formaldehyde solution, whereupon it is etherified with methanol as described above. As is known, it is necessary to prevent too extensive intro-molecular condensations both when manufacturing the melamine-formaldehyde condensate and when etherifying and isolating said condensate.

The component (ii) to be used in the present process may be any as such known alkyd or polyester resin having an acid number not much less than 30 and/or a hydroxyl number not much less than 75. Such alkyd resins are polyesters prepared from polyhydric alcohols—such as glycerol, pentaerythritol, hexanetriol or trimethylolpropane—and polybasic saturated or unsaturated, aliphatic, hydroaromatic or aromatic carboxylic acids modified, as a rule, by incorporation of a varying amount of long-chain saturated or unsaturated monocarboxylic acids, such as fatty acids or oleic acids, or of resin acids. As polycarboxylic acids suitable for the synthesis of the alkyd resins there may be mentioned, for example, succinic acid, adipic acid, sebacic acid, citric acid, maleic acid, fumaric acid, phthalic acid, hydrophthalic acid, camphoric acid and adducts of maleic acid. As monocarboxylic acids there may be mentioned the optionally dehydrated acids obtainable from drying or non-drying fats or oils, for example castor oil, coconut oil, stearin, cotton seed oil, train oil, soybean oil, perilla oil, tall oil and similar substances, and also synthetic fatty acids.

As component (iii) there are suitable strongly basic nitrogen compounds capable of forming water-soluble soaps with the component (ii), such as ammonia or primary, secondary or tertiary aliphatic amines, polyvalent aliphatic amines, for example ethylenediamine, or alkylolamines; special mention in this connection deserve tertiary aliphatic amines, tertiary alkylolamines, such as triethanolamine, and preferably tertiary alkylol-alkylamines, such as diethanol-methylamine or dimethyl-aminoethanol.

As component (iv) there are suitable organic solvents that are unrestrictedly or substantially miscible with water and are compatible with the components (i) and (ii), for example aliphatic alcohols and preferably glycol monoalkyl ethers. This component may always be present, but need not always be used; it is used with advantage whenever it is not very easy to achieve a homogeneous combination of the components (i) to (iii) without it or when, depending on the selected components (i) and (ii), an effect is aimed at the promotes solubility in water and/or enhances the stability of the aqueous solutions of the components (i) to (iii). Component (iv) is used in such a case in an amount that is just sufficient to achieve the desired effect and ranges from 0 to 35% of the combined weights of the components (i) and (ii).

The components (i), (ii) and (iii), and if desired (iv), may be combined in any desired order of succession, depending on the type of the components used at room temperature or a slightly higher temperature which should not be substantially above 80° C. Alternatively, the combination may be performed in the presence of water—which is added as such or in the form of a concentrated aqueous solution of the component (i), or in any other form—whereby there are obtained concentrated, stable solutions having a resin dry content of, for example, 60% or more, which can be diluted with water in any proportion.

Depending on the use to which it is to be put, the synthetic resin composition may advantageously further contain a flow agent, for example a silicone, cellulose ether, or a cationic, anionic, or non-ionic wetting agent.

The aqueous, if desired pigmented, solutions of the synthetic resin compositions of the invention can be used as stoving varnishes applied in mass production to metal objects of all descriptions by spraying, dipping or rolling. They are also suitable as thermosetting binding and impregnating agents, or for the manufacture of laminates.

Unless otherwise indicated, parts and percentages in the following examples, which illustrate the invention, are by weight.

*Example 1*

360 parts of a phthalate resin which has been modified with ricinoleic fatty acid (phthalate content 59%; fatty acid content 41%; acid number 29; hydroxyl number 162; saponification number 369) are mixed with 24 parts of dimethyl-aminoethanol and 240 parts of the methylolmelamine methyl ether referred to below at a temperature of about 60° C. The resulting highly viscous, substantially solid synthetic resin composition is unrestrictedly soluble in water at room temperature.

An aqueous solution containing 30% of the above synthetic resin composition is quite stable, flows well, and when stoved for 30 minutes at 150° C. on sheet iron it leaves a coat of varnish which is free from pitting (pendulum hardness according to Persoz: about 202 seconds).

100 parts of an aqueous solution of 60% strength of the synthetic resin composition are pasted with 40 parts of a white pigment (titanium dioxide) and 0.05 part of silicone oil. The paste thus obtained is diluted with water to a viscosity of about 25-40 seconds (determined by means of a Ford beaker). When the pigmented varnish prepared in this manner is sprayed with a spray gun on sheet iron and then stoved for 30 minutes at 150° C., a hard white coat is obtained which has a fine gloss and is free from pitting and which does not turn yellow on ageing.

The methylolmelamine methyl ether which is water-soluble at room temperature used in the above example was prepared in known manner as follows: 126 parts of melamine (1 molecular proportion) were dissolved with heating at 90° C. in 600 parts of an aqueous formaldehyde solution of 37% strength (7.4 molecular proportions) which had previously been adjusted to pH=9 to 10 by addition of an aqueous sodium hydroxide solution of 30% strength. The resulting solution was heated on for 20 minutes at 90° C. and then concentrated under reduced pressure to about ⅔ of its original volume. While cooling it to room temperature, the concentrate was treated with 620 parts (19.4 molecular proportions) of methanol and then etherified with a mixture, precooled to 15° C. of 120 parts of methanol (3.7 molecular proportions) and 70 parts of concentrated hydrochloric acid of 37% strength, whereupon the reaction mixture had a pH value of about 1.3; after 20 to 30 minutes it had cleared and was then adjusted to pH 7 to 8 by adding anhydrous sodium carbonate in portions. After about 20 minutes, the precipitated sodium chloride was filtered off, and the solvents (water and methanol) were completely removed from the filtrate by distillation in vacuo. The resulting clear, colorless ether of low viscosity revealed in the analysis that it contained on an average about 4.0 methoxymethyl groups and about 0.7 methylol groups and about 0.7 methylol group per molecular proportion of the melamine used.

*Example 2*

360 parts of the alkyd resin used in Example 1, 80 parts of butylglycol (glycol n-butyl monoether) and 24 parts of dimethyl-aminoethanol are turned into a homogeneous mixture at 60 to 80° C., allowed to cool to about 40° C., and 240 parts of the methylolmelamine methyl ether described in Example 1 are then added, whereupon a viscid synthetic resin composition forms which is unrestrictedly soluble in water at room temperature. The aqueous solutions of this synthetic resin composition are very stable, in fact even more stable than the aqueous solutions of the synthetic resin composition obtained as described in Example 1.

An aqueous solution containing 30% of this synthetic resin composition flows perfectly and forms on sheet iron after stoving for 30 minutes at 150° C. a coat that cannot be scratched with a fingernail (pendulum hardness according to Persoz: 294 seconds), is free from pitting and does not turn yellow on ageing.

When in the above example there is used as the alkyd resin a phthalate resin modified with dehydrated castor oil fatty acid (phthalate content 60%; fatty acid content 40%; acid number 32; hydroxyl number 109; saponification number 312) or a phthalate resin modified with coconut oil fatty acid (phthalate content 66%; fatty acid content 34%; acid number 50; hydroxyl number 74; saponification number 443), there are obtained synthetic resin compositions which are unrestrictedly water-soluble at room temperature and possess substantially identical properties. Aqueous solutions containing 30% of the resin, likewise flow well and when stoved on sheet iron form varnish coats that cannot be scratched with a fingernail and are free from pitting, having a pendulum hardness according to Persoz of 342 seconds and 340 seconds respectively. The coat produced with the phthalate resin modified with dehydrated castor oil fatty acid is slightly yellowish, while the other resin coat remains colorless.

*Example 3*

360 parts of the phthalate resin modified with dehydrated castor oil fatty acid used in Example 2, 328 parts of an aqueous solution of 73% strength of methylolmelamine methyl ether described below, 24 parts of dimethyl-amino-ethanol and 200 parts of glycol butylate are mixed at about 60° C. to form a homogeneous liquid composition of low viscosity which is unrestrictedly soluble in water at room temperature.

An aqueous solution containing 30% of this synthetic resin composition is stable, runs well and, when stoved on sheet iron, it forms a varnish coat of fine lustre which cannot be scratched with a fingernail (pendulum hardness according to Persoz: 305 seconds) and is free from pitting.

The aqueous solution of 73% strength of methylolmelamine methyl ether used in this example was prepared in known manner as follows: 126 parts of melamine (1 molecular proportion) were introduced into 600 parts of an aqueous formaldehyde solution of 37% strength (7.4 molecular proportions) which had previously been adjusted to pH=9 to 10 with an aqueous sodium hydroxide solution of 30% strength and had been heated to 65° C. The mixture was then heated to 90 to 92° C. and maintained at this temperature for about 30 minutes at a constant pH value of 9 to 10. The reaction mixture was then cooled to 42° C., treated with 460 parts of methanol (14.4 molecular proportions), the internal temperature was stabilized at about 60° C., and the pH value was adjusted to 1-2 with concentrated hydrochloric acid, whereby the temperature was caused to rise to 63 to 64° C. After 25 minutes the whole was adjusted to pH=9—10 with aqueous sodium hydroxide solution of 30% strength, the precipitated sodium chloride was filtered off, and the filtrate was concentrated under reduced pressure to a resin content of about 73%. When a specimen of the resin was isolated from the resulting solution and freed from moisture, its analysis revealed that the ether prepared in this manner contained on an average about 2.3 methoxymethyl groups and 1.3 methylol groups for every molecular proportion of melamine used.

*Example 4*

360 parts of the alkyd resin used in Example 3, 24 parts of dimethyl-aminoethanol and 80 parts of glycol butylate are mixed at about 80° C. The mixture was cooled to 40° C. and then treated with 240 parts of the methylolmelamine methyl ether described below and then with 296 parts of distilled water. There was thus obtained directly a very stable solution containing 60% of resin, of an unrestrictedly water-soluble synthetic resin composition, which can be diluted as it is with any desired proportion of water.

A solution prepared therefrom by dilution with water to a resin content of 30%, is quite stable, runs well and when stoved on sheet iron forms a hard, glossy varnish film (pendulum hardness according to Persoz: 290 seconds) which is free from pitting.

The methylolmelamine methyl ether used in this example was prepared in known manner as follows: 324 parts of hexamethylolmelamine (1 molecular proportion) were stirred at room temperature into a mixture consisting of 960 parts of methanol (30 molecular proportions) and about 100 parts of hydrochloric acid of 37% strength. The solution thus prepared was neutralized with sodium carbonate, the precipitated sodium chloride was filtered off and the filtrate was evaporated to dryness. The resulting solid, white, slightly tacky substance was a methylolmelamine methyl ether, which as revealed by its analysis, contained on an average about 5.2 methoxymethyl groups and about 0.4 methylol group for every molecular proportion of melamine used.

*Example 5*

20 parts of alkyd resin the manufacture of which is described below are mixed with 2 parts of dimethylamino ethanol, 11 parts of butyl glycol, 80 parts of the melamine ether resin described in Example 1, and 12 parts of water at a temperature of about 60° C. The resulting lacquer resin composition can be readily diluted with water.

An aqueous solution of this artificial resin composition having a resin content of about 55% flows well and after being stoved at 150° C. gives a hard lacquer coating which adheres firmly to sheet iron (pendulum hardness according to Persoz: 210 seconds). An addition of 0.02% (calculated on 100% resin) of the reaction product of 1 mol of paratertiary octyl phenol and 9 mols of ethylene oxide further improves the surface properties of the lacquer.

The alkyd resin used in this example can be prepared as follows: 134 g. of trimethylol propane, 122 g. of benzoic acid, and 0.5 g. of hypophosphorus acid are heated at about 200 to 240° C. until the acid number is about 5. 100 g. of the resulting resin are heated at about 230° C. with 69 g. of sebacic acid until an acid number of about 35 is reached. The hydroxyl number of this resin is 102.

What is claimed is:

1. Process for the manufacture of unrestrictedly water-soluble synthetic resin compositions by combining a water-soluble, curable etherified melamine-formaldehyde condensate with a plastifying unoxidized alkyd resin containing carboxyl groups and with a water-soluble, strongly basic nitrogen compound capable of forming soaps with said condensate, wherein the following components are combined in any desired order of succession:
   (i) a curable methyl ether, which is water-soluble at room temperature, of a melamine-formaldehyde condensate which contains at least as many methoxymethyl groups as free methylol groups;
   (ii) a plastifying unoxidized alkyd resin containing carboxyl groups, having an acid number of about 30 to about 60 and a hydroxyl number of about 75 to about 180;
   (iii) a strongly basic nitrogen compound capable of forming a water-soluble soap with the component (ii), and
   (iv) an organic solvent that is at least substantially miscible with water and is compatible with the resin components, in an amount of 0 to 35% of the combined weights of components (i) and (ii), the ratio by weight of component (i) to component (ii) ranging from 20:80 to 80:20.

2. Process as claimed in claim 1, wherein the component (iii) is a tertiary alkylolamine and the component (iv) is an aliphatic alcohol that is at least substantially miscible with water.

3. Process as claimed in claim 1, wherein the component (iii) as a water-soluble tertiary alkylol-alkylamine and the component (iv) is a glycol monoalkyl ether that is at least substantially miscible with water.

4. Process as claimed in claim 1, wherein the combination of the components is performed in the presence of water.

5. Process as claimed in claim 1, wherein the curable methyl ether (1) contains twice as many methoxyl groups as free methylol groups.

6. Process as claimed in claim 1, wherein the nitrogen compound (iii) is a tertiary aliphatic amine.

7. A water-soluble synthetic resin composition which comprises the combination product of the following components:
   (i) a curable methyl ether, which is water-soluble at room temperature, of a melamine-formaldehyde condensate which contains at least as many methoxymethyl groups as free methylol groups;
   (ii) a plastifying unoxidized alkyd resin containing carboxyl groups, having an acid number of about 30 to about 60 and a hydroxyl number of about 75 to about 180;
   (iii) a strongly basic nitrogen compound capable of forming a water-soluble soap with the component (ii), and (iv) an organic solvent that is at least substantially miscible with water and is compatible with the resin components, in an amount of 0 to 35% of the combined weights of components (i) and (ii), the ratio by weight of component (i) to component (ii) ranging from 20:80 to 80:20.

8. A liquid composition comprising the combination product of:
(i) a curable methyl ether, which is water-soluble at room temperature, of a melamine-formaldehyde condensate which contains at least as many methoxymethyl groups as free methylol groups;
(ii) a plastifying unoxidized alkyd resin containing carboxyl groups, having an acid number of about 30 to about 60 and a hydroxyl number of about 75 to about 180;
(iii) a strongly basic nitrogen compound capable of forming a water-soluble soap with the component (ii);
(iv) an organic solvent that is at least substantially miscible with water and is compatible with the resin components, in an amount of 0 to 35% of the combined weights of components (i) and (ii), the ratio by weight of component (i) to component (ii) ranging from 20:80 to 80:20, and
(v) water.

References Cited by the Examiner
UNITED STATES PATENTS

| | | | |
|---|---|---|---|
| 2,402,032 | 6/1946 | Fischer | 260—29.4 |
| 2,446,864 | 8/1948 | Abrams | 260—29.4 |
| 2,471,396 | 5/1949 | Light | 260—29.4 |
| 2,681,894 | 6/1954 | Hoenel | 260—29.4 |
| 2,915,486 | 12/1959 | Shelley | 260—29.4 |
| 2,915,487 | 12/1959 | Shelley | 260—29.4 |
| 2,974,065 | 3/1961 | Mann et al. | 260—29.4 |

FOREIGN PATENTS

| | | |
|---|---|---|
| 842,413 | 7/1960 | Great Britain. |
| 198,858 | 7/1958 | Austria. |
| 204,150 | 6/1959 | Austria. |

MURRAY TILLMAN, *Primary Examiner.*

LEON J. BERCOVITZ, *Examiner.*